June 7, 1960
C. E. LEARN
2,939,928
FLUID PRESSURE SWITCH
Filed March 5, 1958
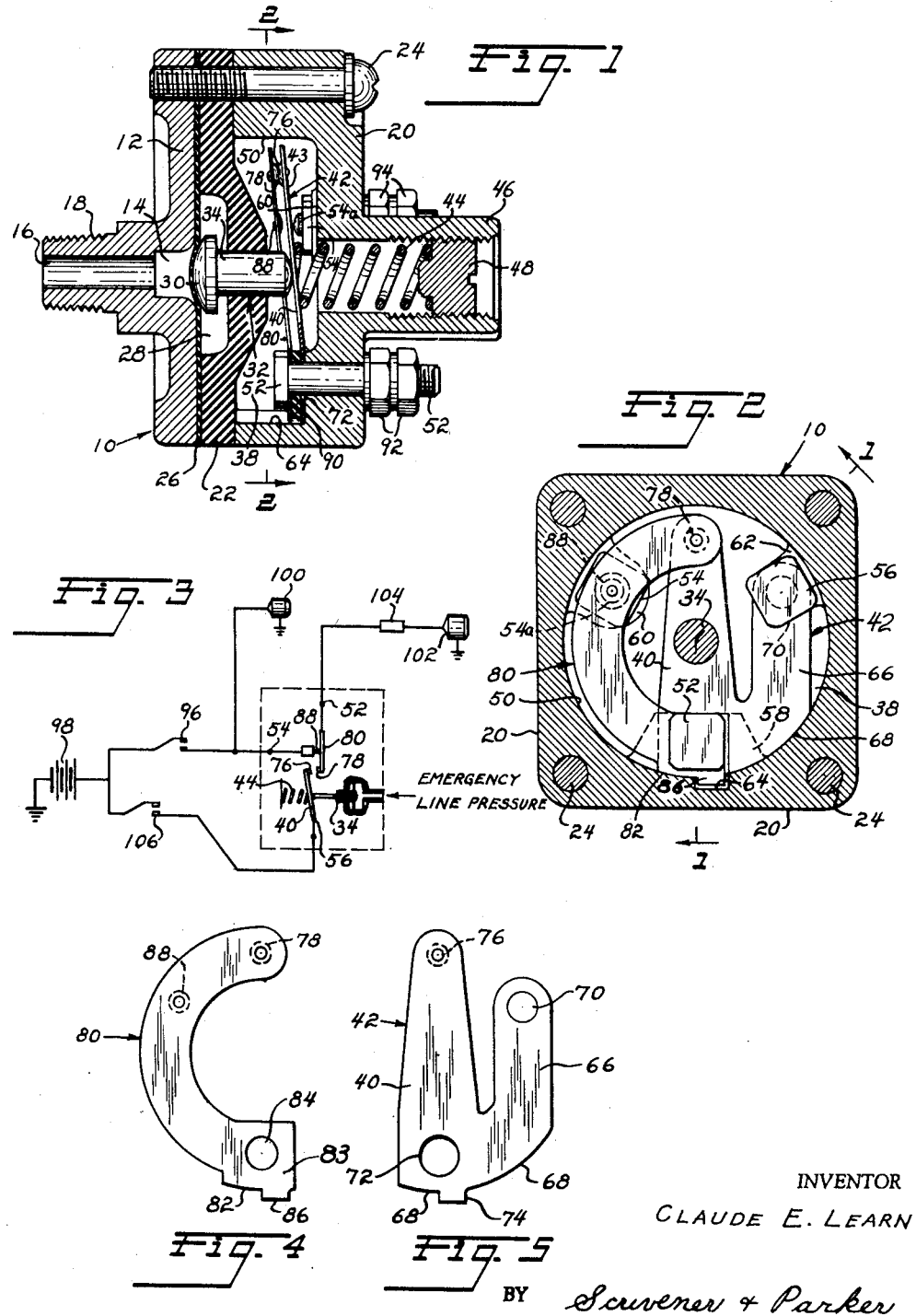
INVENTOR
CLAUDE E. LEARN
BY Scrivener & Parker
ATTORNEYS

United States Patent Office 2,939,928
Patented June 7, 1960

2,939,928

FLUID PRESSURE SWITCH

Claude E. Learn, Elyria, Ohio, assignor to Bendix-Westinghouse Automotive Air Brake Company, Elyria, Ohio, a corporation of Delaware Filed Mar. 5, 1958, Ser. No. 719,248

3 Claims. (Cl. 200—83)

This invention relates to electric switches and more particularly to improvements in a fluid responsive switch.

A primary object of the present invention is the provision of an electric switch assembly in which the switch arm members are accurately and readily mounted so that the switch assembly is especially adaptable to mass production.

More specifically it is an object of the present invention to provide a readily assembled switch wherein means are provided for accurately mounting the switch arms and in addition said means are so arranged that the switch can only be assembled in one way thereby eliminating the possibility of reversal of parts during the assembling process.

In addition to the above, it is an object of the invention to provide a fluid responsive electric switch which is especially, though not exclusively, suited to fluid pressure brake systems for tractor-trailer combinations wherein the switch in one position during normal operation of the brake system merely serves to complete a circuit between the normal brake switch and trailer braker lights but upon loss of fluid pressure the switch of the invention automatically completes a second circuit to energize the trailer brake lights to indicate an emergency brake application, a feature of the invention residing in the fact that regardless of the condition of the brake system, electrical connection is maintained through the switch to the trailer brake lights without any break in the connection as the switch elements move to complete either the first or the second circuit.

Other objects and their attendant advantages will become apparent as the following detailed description is read in conjunction with the accompanying drawings wherein:

Fig. 1 is an axial cross-sectional view of the switch of the present invention taken substantially on the line 1—1 of Fig. 2;

Fig. 2 is a horizontal cross-sectional view of the switch of the invention taken substantially on the line 2—2 of Fig. 1;

Fig. 3 is a schematic wiring diagram of the switch of the invention as employed in conjunction with a tractor-trailer braking system;

Fig. 4 is a plan elevation of one of the switch arm members; and

Fig. 5 is a plan elevation of the other switch arm member.

Referring now to the drawings, the switch of the invention comprises a casing 10 having a cover member 12 which forms a chamber 14 connected to a source of fluid pressure by way of a passage 16 in a threaded shank 18.

The casing 10, in addition to cover 12, is composed of a body member 20 and an intermediate member 22 both of which are attached to the cover member by a plurality of machine screws 24. The body member 20 and the intermediate member may be molded of insulating material and clamped between the cover 12 and the intermediate member is a diaphragm 26 of insulating material. The intermediate member is provided with a cavity 28 in which operates the head 30 of an actuating member 32 having a stem 34 slidingly received in a central aperture in the intermediate member 22. The stem 34 extends into a switch cavity 38 formed in the body member 20 and abuts the central arm 40 of a switch member 42 hereinafter described in detail. Engaging the opposite side of the arm 40 is one end of a spring 44 whose opposite end is received in an interiorly threaded hollow neck 46 containing an adjustable plug 48 which may be screwed inwardly or outwardly to vary the compression or loading of spring 44.

The switch cavity 38 has a cylindrical side wall 50 and is provided with three equiangularly spaced holes having their centers on a circle spaced inwardly from the side wall 50. Each of said holes is adapted to receive a respective terminal member 52, 54, and 56 and each of these may have around it a suitable reinforcing land 58, 60, and 62. In the side wall 50 of cavity 38 and adjacent to terminal 52 is a channel or groove 64 which is offset to one side of a diametral line through the terminal and the center of the cavity as clearly shown in Fig. 2. The groove 64, in accordance with the invention, serves to locate the switch arms in cooperation with the aforesaid terminals as will become fully apparent.

The switch member 42, already mentioned, has in addition to the arm 40 a mounting portion 66 from which the arm 40 extends in cantilever fashion. The mounting portion 66 is preferably straight and has at its inner end a circular edge 68 of substantially the same curvature as the wall 50. The outer end of portion 66 is provided with a hole 70 for receiving terminal 56 and the inner end of the arm is provided with a larger hole 72 adapted to register with but not be contacted by the terminal 52. Integral with the outer edge 68 in a position to register with the groove or slot 64 is a guiding or locating tang or projection 74 which accurately locates and retains the switch member in its position of use when the holes 70 and 72 are in registering relationship with the holes in the body member receiving the terminal members 52 and 56.

The outer end of the cantilever arm 40 carries a contact member 76 which, with the parts of the switch in the position of Fig. 1, engages a second contact 78 on the end of a second switch arm 80 made of strip spring material. As illustrated in Fig. 4, the switch arm 80 is substantially semi-circular in shape and has at its inner end a mounting portion 83 having a curved outer edge 82 corresponding substantially to the curvature of the wall 50. A hole 84, preferably of the same diameter as hole 70 in mounting portion 66, is provided in said one end and adjacent this hole integral with edge 82 is a tang 86 which is adapted to register with slot 64 in alignment with tang 74 when hole 84 is in registering relationship with the hole for terminal 52.

In addition to contact 78, switch arm 80 is provided with a second electrical contact 88 which is adapted to register with and engage the terminal 54 when the diaphragm 26 and hence cantilever arm 40, is moved to the right in Fig. 1 by the admission of air pressure to cavity 14. In order that the contact 88 will engage terminal member 54, the switch member 80 is biased to the right in Fig. 1 so that as the cantilever arm 40 moves to the right, switch arm 80 follows it with the contacts 78 and 76 remaining in electrical engagement until contact 88 engages terminal member 54 whereupon the switch arm 80 is "hung-up" so that continued movement of cantilever arm 40 to the right breaks the connection between contacts 76 and 78 so that an electrical circuit is now completed exclusively through terminal 54, switch arm 80 and terminal 52.

The terminal member 54 is assembled in place then the aforementioned switch arm members are mounted and held in position by the terminal members 52 and 56 which not only fix the switch arm members in position but also insure, in cooperation with groove 64 and tangs 74 and 86, the proper disposition of the switch arms within the switch cavity 38. For example, the switch arm member 42 is placed within the cavity with the hole 70 in mounting portion 66 in alignment with the hole for terminal 56 and the tang 74 engaged in slot 64. Since the tang is offset as described, it would not be possible for an assembler to place the switch member in a position with the mounting portion 66 reversed, that is, on the left hand side in Fig. 2 rather than the right hand side as shown. After the switch member has been positioned terminal 56 is inserted. This member has a square head of sufficient size to abut wall 50 to prevent turning when attaching nuts are engaged with the threaded shank of the terminal member. With the switch arm 42 in its position of use, the hole 72, which is larger than the hole for terminal 52, is concentrically located over the latter hole and the edge 68 is in substantial abutting relationship with the cylindrical wall 50.

Next an insulating member 90 provided with a hole of the same size as the holes 70 and 84 in the respective switch arms is placed over hole 72 in the switch member 42, and the second switch member 80 is placed in the switch cavity 38 with hole 84 in alignment with hole 72 and the tang 86 engaged in slot 64. Once again, due to the offset nature of the tang 86, it would be virtually impossible for the assembler to position the switch member 80 with its curved portion on the right in Fig. 2 rather than on the left as shown. When the switch member is correctly positioned, the terminal 52 is inserted through the aligned holes of the switch members, the hole of insulating member 90 and the terminal hole in the body 20. The usual lockwasher and attaching nuts, designated generally by the numeral 92, are then placed on the threaded shank of terminal 52 in the customary manner. The enlarged head of terminal 52 may abut the cylindrical wall 50 of cavity 38 to prevent the terminal from turning while the nuts 92 are installed.

When the terminal members have been fixed in their position of use as described, contact 88 overlies terminal 54 which differs from terminals 52, 56 in that it is provided on its upper surface with a rounded contact 54a for forming an abutting type electrical connection with contact 88. The outer end of the terminal 54 is provided with the usual lockwashers and nuts, designated by the numeral 94 in Fig. 1, identical to the nuts 92 of the terminal 52 and the enlarged head of terminal 54 prevents turning as has been explained in the use of terminal 52.

It should be noted that the terminal member 52 exerts a clamping action upon switch member 42 through the pressure exerted on insulator member 90 and that the switch member 42 cannot shift laterally because of the engagement of tang 74 in slot 64 and because of the terminal member 56. Though terminal member 52 holds the inner end of the switch member 52 in place through clamping action, there is no danger of short circuit because the tang 74 and terminal 56 locates switch arm 42 so that the enlarged hole 72 encircles terminal 52 but is spaced from the terminal shank.

After the switch arms and terminals are fixed in their positions of use, final assembly of the switch of the invention is completed by placing on the body member 20 first, the intermediate member with the actuating elements 32 positioned therein, then the diaphragm 26, and finally the cover member 12, all of which are then clamped together by the screws 24. As a final step, the spring 44 is placed in the neck 46 and the adjusting plug 48 screwed therein until the spring is properly loaded which may be determined preferably by the admission of test air pressure into passage 16 in a manner well-known in the art of balancing spring loading against diaphragm pressure.

As has been previously mentioned, the assembled switch is particularly suited for use in connection with signalling to following vehicles brake application of a tractor-trailer combination. Heretofore, during normal brake application, depression of the brake pedal has caused a brake light switch to energize the brake lights at the rear of the trailer. Tractor-trailer combinations have, as a safety feature, means for automatically applying the brakes independently of the brake pedal when certain conditions prevail, as for example, when the air pressure for the brakes falls to a predetermined low and unsafe value. Automatic brake application is almost universally brought about by the rapid exhaustion of pressure from a normally pressurized emergency line, this exhaustion being automatically achieved through the action of valve devices responsive to low pressure which devices are not here pertinent and need not be described, it being sufficient to say that heretofore when the emergency line was exhausted to cause automatic trailer brake operation, no brake signal was transmitted to following vehicles, resulting sometimes in serious accidents. The switch of the present invention provides for automatic lighting of the trailer brake lights during an emergency brake application while not in any way interfering with the operation of the brake lights during normal brake application.

For use in brake systems the threaded shank 18 would be suitably connected on the tractor to the trailer emergency line so that during normal operation emergency pressure in the line would exert a force on diaphragm 26 moving it to the right in Fig. 1. Also for brake system use, the terminal 54 would be connected in the normal stoplight circuit (see Fig. 3) which includes a pedal operated brake switch 96, the usual battery 98 and tractor and trailer brake lights 100, 102. A suitable electrical connection or plug means 104 would connect the trailer brake lights into the system, the lead from plug 104 being connected to the switch of the invention at terminal 52. As the diaphragm is moved to the left in Fig. 3 by pressure build-up, switch arm 40 is moved until contact 88 engages terminal 54 whereupon the normal brake light circuit is placed in condition for operation through battery 98, brake pedal switch 96, terminal 54, arm 80 and terminal 52 so that whenever the brake pedal is depressed, switch 96 is closed and the brake lights 100, 102 energized. As the pressure on diaphragm 26 continues to build up, it moves further to the left in Fig. 3 so that contact 76 on arm 40 is moved out of engagement with contact 78 as shown and the emergency circuit from battery 98, through ignition switch 106, terminal 56, and arm 40, is opened and this remains open at all times during normal brake system operation. Should brake system pressure fall to the point where the emergency line is automatically exhausted, then and in that event the pressure acting on diaphragm 26 is likewise exhausted permitting spring 44 to move arm 40 towards arm 80. When contact 76 engages contact 78, contact 88 is lifted clear of terminal 54 and the emergency circuit is simultaneously completed from battery 98 through ignition switch 106 (this would normally be closed at all times during operation of the tractor), terminal 56, switch arms 40 and 80, and terminal 52 to the trailer stop light 102 causing this to be energized entirely independently of the brake pedal switch 96.

It will be observed that an important feature of the invention resides in the fact that regardless of what position may be occupied by the parts of the switch of the invention, there are always at least two contacts closed so that a circuit is always completed through the switch from the power source to the device to be energized. Heretofore in fluid pressure switches which have utilized a switch element movable between alternative spaced contacts it has been possible during partial pressure conditions for the movable element to be retained intermediate the contacts with no circuit at all being completed through the pressure switch. With the switch of the present invention, it will be apparent that regardless of the pressure acting on the diaphragm, there can never be a break in the circuitry since at all times at least two contacts are engaged.

From the foregoing, it will now be apparent that the present invention has provided a readily assembled pressure switch in which the parts are so arranged that it would not be possible for an assembler to position the parts in reverse position during assembly. Furthermore, it will be apparent that the present invention has provided a pressure switch capable of a variety of uses and particularly, though by no means exclusively, valuable for use in tractor-trailer brake light systems.

It will be apparent that the invention is susceptible of various modifications and changes without, however, departing from the scope and spirit of the appended claims.

What is claimed is:

1. A fluid operated switch assembly comprising a casing providing a chamber having a cylindrical side wall and a circular bottom wall, three equi-angular terminals projecting through said bottom wall, a switch element having a mounting portion containing spaced holes registering respectively with a first and second of said terminals with said mounting portion being in electrical engagement with the first of said terminals and out of electrical engagement with the second of said terminals, a cantilever arm integrally attached to said mounting portion adjacent said second terminal, a second switch element having a mounting portion containing a hole registering with said second terminal and having a semicircular switch arm integral with said mounting portion and extending therefrom so that its end overlies said cantilever arm and its intermediate portion overlies said third terminal, said mounting portion being in electrical engagement with said second terminal, said semicircular switch arm being biased in the direction of said third terminal, resilient means acting on said cantilever arm normally urging it into electrical engagement with said switch arm while simultaneously urging said switch arm out of electrical engagement with said third terminal, fluid responsive means in said casing operatively connected to said cantilever arm in opposition to said resilient means for moving said arm against said resilient means in a direction away from said switch arm in response to fluid pressure acting on said pressure responsive means, said switch arm being moved by its bias into electrical engagement with said third terminal before said cantilever arm is moved out of electrical engagement with said switch arm and vice versa so as to maintain alternative but unbroken electrical connection between said second terminal and said first or third terminals depending upon the fluid pressure acting on said pressure responsive device.

2. The fluid pressure operated switch of claim 1 wherein each of said mounting portions have an arcuate edge portion adjacent said second terminal and substantially corresponding in curvature to that of the cylindrical wall of said chamber, a tang projecting from the circular edge portion of each of said mounting portions in vertical alignment with each other, said tangs being offset to one side of a diametral line through said second terminal, and a slot in the wall of said chamber in a position to register with said tangs so as to locate said switch elements in a nonreversible position with the arcuate edges abutting the side walls in said chamber with the respective holes thereof registering with said first and second electrical terminals.

3. The fluid pressure operated switch of claim 1 including means for adjusting the loading of said resilient means.

References Cited in the file of this patent

UNITED STATES PATENTS

| | | |
|---|---|---|
| 2,445,756 | Bean | July 27, 1948 |
| 2,632,065 | Smith et al. | Mar. 17, 1953 |
| 2,647,968 | Byman | Aug. 4, 1953 |
| 2,766,350 | Gres et al. | Oct. 9, 1956 |
| 2,823,271 | Wagstaff | Feb. 11, 1958 |